US007628330B2

(12) United States Patent
Tomita

(10) Patent No.: US 7,628,330 B2
(45) Date of Patent: *Dec. 8, 2009

(54) BARCODE AND DECREASED-RESOLUTION REPRODUCTION OF A DOCUMENT IMAGE

(75) Inventor: Hiroshi Tomita, San Carlos, CA (US)

(73) Assignee: Konica Minolta Systems Laboratory, Inc., Huntington Beach, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 11/724,535

(22) Filed: Mar. 14, 2007

(65) Prior Publication Data

US 2008/0080777 A1 Apr. 3, 2008

Related U.S. Application Data

(63) Continuation-in-part of application No. 11/537,563, filed on Sep. 29, 2006.

(51) Int. Cl.
*G06K 9/18* (2006.01)
*G06K 19/06* (2006.01)

(52) U.S. Cl. ............. 235/462.09; 235/375; 235/462.08; 235/494

(58) Field of Classification Search ................. 235/375, 235/462.09, 462.1, 462.15, 487, 494; 358/3.24, 358/501, 539
See application file for complete search history.

(56) References Cited

U.S. PATENT DOCUMENTS

| 5,016,214 | A | | 5/1991 | Laymoun |
| 5,243,655 | A | | 9/1993 | Wang |
| 5,325,167 | A | | 6/1994 | Melen |
| 5,337,362 | A | | 8/1994 | Gormish et al. |
| 5,388,158 | A | | 2/1995 | Berson |
| 5,486,686 | A | | 1/1996 | Zdybel, Jr. et al. |
| 5,490,217 | A | * | 2/1996 | Wang et al. ............... 380/51 |
| 5,506,697 | A | * | 4/1996 | Li et al. ................ 358/448 |
| 5,544,045 | A | | 8/1996 | Garland et al. |
| 5,576,528 | A | | 11/1996 | Chew et al. |
| 5,606,609 | A | | 2/1997 | Houser et al. |
| 5,612,524 | A | | 3/1997 | Sant'Anselmo et al. |
| 5,671,282 | A | | 9/1997 | Wolff et al. |
| 5,680,470 | A | | 10/1997 | Moussa et al. |
| 5,734,800 | A | | 3/1998 | Herbert et al. |
| 5,754,697 | A | * | 5/1998 | Fu et al. ................ 382/232 |
| 5,760,382 | A | * | 6/1998 | Li et al. ................ 235/436 |
| 5,799,082 | A | | 8/1998 | Murphy et al. |

(Continued)

OTHER PUBLICATIONS

Adobe Acrobat, retrieved from http://en.wikipedia.org/wiki/Adobe_Acrobat on Dec. 19, 2008, 7 pages.

(Continued)

*Primary Examiner*—Thien M. Le
*Assistant Examiner*—Tuyen K Vo
(74) *Attorney, Agent, or Firm*—Finnegan, Henderson, Farabow, Garrett & Dunner, LLP

(57) ABSTRACT

Systems, methods and storage mediums are disclosed for processing image data and associated two-dimensional barcodes for decreased data storage requirements and increased data transfer capabilities. Image data of a document may be obtained, processed, and rendered into a barcode including image data from which the document may be substantially reproduced. The barcode may be incorporated into a reproduction of the document. The amount of data associated with the reproduction of the document may be decreased by reducing the resolution of the reproduction, thereby allowing for decreased data storage requirements and increased data transfer capabilities. The amount of data may also be decreased by reducing the area of the reproduction.

20 Claims, 6 Drawing Sheets

U.S. PATENT DOCUMENTS

| | | | |
|---|---|---|---|
| 5,862,270 | A | 1/1999 | Lopresti et al. |
| 5,905,800 | A | 5/1999 | Moskowitz et al. |
| 5,956,409 | A | 9/1999 | Chan et al. |
| 5,987,153 | A | 11/1999 | Chan et al. |
| 6,035,406 | A | 3/2000 | Moussa et al. |
| 6,082,619 | A | 7/2000 | Ma et al. |
| 6,115,508 | A | 9/2000 | Lopresti et al. |
| 6,173,154 | B1 | 1/2001 | Kucinski et al. |
| 6,212,504 | B1 | 4/2001 | Hayosh |
| 6,285,775 | B1 | 9/2001 | Wu et al. |
| 6,320,982 | B1 | 11/2001 | Kurzweil et al. |
| 6,382,510 | B1 | 5/2002 | Ni |
| 6,418,244 | B2 | 7/2002 | Zhou et al. |
| 6,498,660 | B2 | 12/2002 | Haltmaier |
| 6,522,770 | B1 | 2/2003 | Seder et al. |
| 6,565,003 | B1 * | 5/2003 | Ma ................ 235/462.1 |
| 6,567,530 | B1 | 5/2003 | Keronen et al. |
| 6,674,456 | B2 | 1/2004 | Miyazaki |
| 6,694,043 | B2 | 2/2004 | Seder et al. |
| 6,839,844 | B1 | 1/2005 | Okano |
| 6,917,724 | B2 | 7/2005 | Seder et al. |
| 7,020,327 | B2 | 3/2006 | Tack-don et al. |
| 7,020,435 | B2 | 3/2006 | Moulthrop et al. |
| 7,032,823 | B2 | 4/2006 | Nojiri |
| 7,040,539 | B1 | 5/2006 | Stover |
| 7,088,857 | B2 | 8/2006 | Zuniga |
| 7,166,347 | B2 | 1/2007 | Inoue et al. |
| 7,185,816 | B1 | 3/2007 | Shoobridge |
| 7,197,644 | B2 | 3/2007 | Brewington |
| 7,523,865 | B2 | 4/2009 | Tomita |
| 2002/0110798 | A1 | 8/2002 | Kucinski et al. |
| 2002/0164053 | A1 | 11/2002 | Seder et al. |
| 2002/0181736 | A1 | 12/2002 | Seder et al. |
| 2002/0181737 | A1 | 12/2002 | Seder et al. |
| 2003/0120930 | A1 | 6/2003 | Simpson et al. |
| 2004/0003255 | A1 | 1/2004 | Apvrille et al. |
| 2004/0027601 | A1 | 2/2004 | Ito et al. |
| 2004/0185424 | A1 | 9/2004 | Kucinski et al. |
| 2004/0202386 | A1 | 10/2004 | Quine |
| 2005/0111867 | A1 | 5/2005 | Hatano |
| 2005/0132194 | A1 | 6/2005 | Ward |
| 2005/0259876 | A1 * | 11/2005 | Ogawa ................ 382/232 |
| 2006/0017802 | A1 | 1/2006 | Yoo et al. |
| 2006/0034505 | A1 | 2/2006 | Luk-Pat et al. |
| 2006/0056735 | A1 | 3/2006 | De Haan |
| 2006/0124744 | A1 | 6/2006 | Gormish et al. |
| 2007/0022053 | A1 | 1/2007 | Waserstein et al. |
| 2007/0036371 | A1 | 2/2007 | Buil et al. |
| 2007/0139710 | A1 * | 6/2007 | Ohta ................ 358/1.16 |
| 2007/0176000 | A1 | 8/2007 | Cattrone et al. |
| 2007/0176001 | A1 * | 8/2007 | Cattrone et al. ........ 235/462.01 |
| 2007/0211310 | A1 | 9/2007 | Kadota |
| 2007/0229915 | A1 | 10/2007 | Iida |
| 2007/0241554 | A1 | 10/2007 | Wicker et al. |
| 2008/0048044 | A1 | 2/2008 | Zhao et al. |
| 2008/0114927 | A1 | 5/2008 | Yao et al. |
| 2008/0173718 | A1 | 7/2008 | Ibe |
| 2008/0216004 | A1 | 9/2008 | Cheng et al. |
| 2009/0031135 | A1 | 1/2009 | Kothandaraman |

OTHER PUBLICATIONS

Adobe Photoshop, retrieved from http://en.wikipedia.org/wiki/Adobe_Photoshop on Jan. 03, 2009, 6 pages.

Adobe® 6.0 Acrobat® Curriculum Guide, Adobe, 2003, lessons 3-5, 27 pages.

Altavion, First Amended Complaint, pleading, Dec. 15, 2008, pp. 43, San Mateo County Superior Court, USA.

Konica/Minolta, Cross Complaint, pleading, Oct. 27, 2008, pp. 13, San Mateo County Superior Court, USA.

Altavion, Inc., Complaint, pleading, Nov. 9, 2007, pp. 26, San Mateo County Superior Court, USA.

Antognini, T., A Flexibly Configurable 2D Bar Code, white paper based on paper delivered to the Information Based Indicia Program Technology Symposium, sponsored by the US Postal Service, Nov. 25- 26, 1996, 24 pages.

Barcode Introduction: PDF417 Symbology, Barcode Technology Online, retrieved from http://www.barcode-controls.com/PDF417.html on Dec. 19, 2008, 5 pages, EaseSoft Inc.

Computer Dictionary, The Comprehensive Standard for Business, School, Library, and Home, 1994, pp. 106 and 146, Second Edition, Microsoft Press.

Conrad, E., Explanation of the Three Types of Cryptosystems—GIAC Research in the Common Body of Knowledge, Feb. 6, 2007, retrieved from http://www.giac.org/resources/whitepaper/cryptography/52.php (1 of 5) on Dec. 3, 2008, 5 pages.

Data Compression, retrieved from http://en.wikipedia.org/wiki/Data_compression on Dec. 2, 2008, 6 pages.

Data matrix (computer), retrieved from http://en.wikipedia.org/wiki/Data_matrix_(computer)on Dec. 19, 2008, 4 pages.

DataGlyphs® Frequently Asked Questions (FAQ), Palo Alto Research Center Incorporated, retrieved from http://www.parc.com/research/projects/dataglyphs/faq.html on Dec. 18, 2008, 10 pages.

Definitions, Encryption, SearchSecurity.com (powered by WhatIs.com), retrieved from http://searchsecurity.techtarget.com/sDefinition/0,,sid14_gci212062,00.html on Dec. 2, 2008, 4 pages, TechTarget.

Encryption Algorithms, retrieved from http://www.mycrypto.net/encryption/crypto_algorithms.html on Dec. 2, 2008, 3 pages.

Encryption, retrieved from http://en.wikipedia.org/wiki/Encryption on Dec. 2, 2008, 2 pages.

Firth, P. Using Barcodes in Documents—Best Practices, Pegasus Imaging Corporation, 2007, 9 pages.

Gengler, B., Adobe Integrates Secures PDF with XML—Business Software—IT Business Special Report, retrieved from http://www.identrust.com/company/press_releases/2004/release_040615.html on Dec. 1, 2008, dated Jun. 14, 2004, 2 pages, press release in The Australian.

Goebel, G., Data Compression, In The Public Domain, Mar. 1, 2007, v1.2./TOC (3 chapters) Public Domain, retrieved from http://www.vectorsite.net/ttdcmp.html on Dec. 2, 2008, 2 pages.

McDaniel, G., IBM Dictionary of Computing, Aug. 1993, pp. 129 and 235, Tenth Edition, McGraw-Hill, Inc.

McGraw-Hill Dictionary of Scientific and Technical Terms, 2003, p. 548, Sixth Edition, McGraw-Hill.

Pretty Good Privacy, retrieved from http://en.wikipedia.org/wiki/Pretty_Good_Privacy on Dec. 11, 2008, 9 pages.

Product Reviews: Design/DTP—Acrobat 4, PC PRO Computing in the Real World, Apr. 2000, Issue 58, retrieved from http://www.pcpro.co.uk/reviews/79/acrobat-4.html on Nov. 14, 2009, 2 pages.

QR Code Barcode (Quick Response Barcode), TechnoRiver, retrieved from http://www.technoriversoft.com/QRCODEBarcode.html on Dec. 18, 2008, 2 pages.

Resnick, P., Standards Track—Internet Message Format, Oct. 2008, 57 pages, The IETF Trust.

Sci-Tech Encyclopedia: Data Compression, 2008, retrieved from http://www.answers.com/topic/data-compression on Dec. 2, 2008, 12 pages.

Sedgewick, J. Image Stitching Using Photoshop, 2003, 4 pages.

Specifications for Popular 2D Bar Codes, Bar Code 1: A Web of Information About Bar Code 2-Dimensional Bar Code Page, retrieved from http://www.adams1.com/stack.html on Dec. 2, 2008, 9 pages.

The American Heritage Dictionary of the English Language, 2006, p. 44, 4th edition, Houghton Mifflin Company.

Tutorial: 1. Introduction to image slicing, How to slice an image, Mar. 22, 2002, 5 pages, Elated Communications Ltd.

* cited by examiner

BARCODE AND DECREASED-RESOLUTION REPRODUCTION OF A DOCUMENT IMAGE

RELATED APPLICATIONS

This application is a continuation-in-part of U.S. patent application Ser. No. 11/537,563 filed Sep. 29, 2006, by Hiroshi Tomita entitled "High Resolution Barcode and Document Including Verification Feature," from which priority is claimed and which is hereby incorporated by reference in its entirety for all purposes.

BACKGROUND

1. Technical Field

This description relates to processing image data and associated two-dimensional barcodes, and, more particularly, to producing a document having a decreased-resolution reproduction of an original image as well as a two-dimensional barcode from which the original image can be reproduced, along with other image processing features associated with the document and barcode.

2. Description of Related Information

Barcoding is a widely used mechanism for facilitating the accurate and secure storage and communication of information. For example, two-dimensional barcodes are often used in retail environments for representing product identification numbers and prices. Alternatively, barcodes have been used on such objects as personal ID cards, driver's licenses, and passports as a way to store alpha-numeric data such as names and dates.

Existing barcode systems are also used to associate barcodes with documents, such as hardcopy paper documents and electronic documents, in order to facilitate their storage and distribution. Systems for transmitting documents having textual, schematic, diagrammatic, graphical and/or photographic information sometimes include components capable of providing documents and their associated barcode data in a secure manner. However, such barcode systems are often unable to preserve the entire image of a document. That is, existing barcode systems may have insufficient capacity to store the amount of barcode data necessary to substantially reproduce an original document image within feasible data parameters. Those systems that are capable of substantially reproducing a document from a barcode typically suffer from the consequences of large file sizes. Therefore, they may involve drawbacks such as unduly burdensome data storage requirements, slow file transfer, and other related disadvantages.

Accordingly, there is a need for improved transmission of sensitive documents wherein document image data can be safely stored in an encrypted barcode prior to transmission. There is also a need for a system and method of associating barcodes with documents such that the barcodes may encode enough information within a relatively small barcode to create a complete reproduction of the document. There is also a need to decrease the overall file size of a document and associated barcode while still providing, if desired, at least a reduced file size reproduction of the original document image.

In sum, there is a need for systems and methods for processing data of an original image in order to produce a document having a decreased-resolution reproduction of the original image and an associated two-dimensional barcode from which the original image can be reproduced.

SUMMARY

Systems, methods, and articles of manufacture consistent with embodiments of the present invention are directed to processing image data, including processing data of an original image in order to produce a document having a decreased-resolution reproduction of the original image and an associated two-dimensional barcode from which the original image can be reproduced.

In accordance with one exemplary embodiment, a system for processing image data is disclosed including: an image-obtaining component that receives original image data from an original image; a storage component that stores a program of instructions including instructions for generating barcode data for a two-dimensional barcode that encodes the original image data such that the original image can be reproduced from the two-dimensional barcode; a processor that processes the original image data; a barcode-producing component that produces the two-dimensional barcode based on the original image data; and a document-producing component that produces a document including the two-dimensional barcode and a reproduction of the original image, wherein the reproduction is represented by a smaller amount of data than the original image, whereby the document has a reduced file size.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the following exemplary embodiments, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers are used throughout the drawings to refer to the same or like parts.

Systems, methods and articles of manufacture directed to document imaging, barcode creation, and associated data processing are disclosed. Specifically, information or data from an image, such as the original image of a document, may be processed to create a two-dimensional barcode. The two-dimensional barcode may encode original image data with sufficiently high resolution that it may be used to reproduce, or otherwise verify the authenticity of, the original image. For these or other purposes, the two-dimensional barcode may be symbolically or physically associated with its corresponding original image or document (e.g., placed over the original image, placed on the original document, illustrated in a reproduction of the original image, rendered on a reproduction of the document, etc.).

The word "document" as used herein, will be intended and understood to include any type of document known in the art such as, for example, hardcopy paper documents or electronic documents including textual, schematic, diagrammatic, graphical and/or photographic information.

Figure 1:
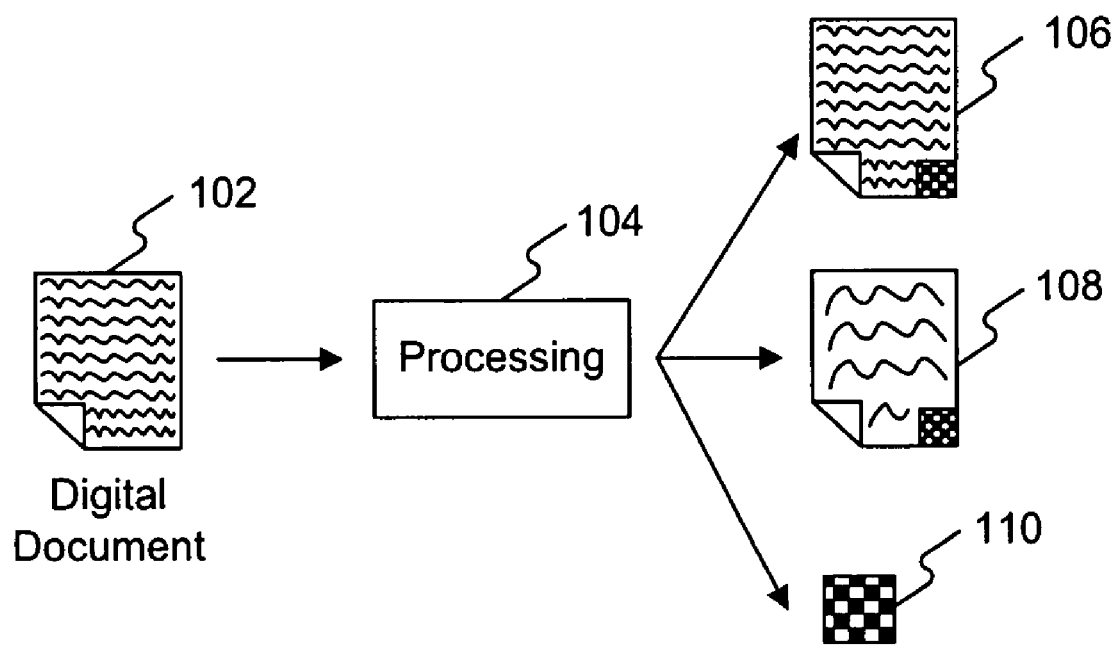
FIG. 1 is a block diagram illustrating original image data processing and document production consistent with the present invention.

Furthermore, it will be appreciated by one of skill in the art that the barcodes illustrated in FIG. 1 and subsequent figures are only exemplary in nature and are not drawn to scale. The illustrated physical sizes of the barcodes in area (i.e., footprint) relative to the sizes of the documents are not meant to be representative of their actual sizes. The actual decrease in barcode area or "footprint" will become apparent to one of skill in the art in view of the resolutions and tile sizes recited herein. Moreover, the actual decrease in image resolution between original images and their decreased-resolution reproductions will become apparent to one of skill in the art in view of the known range of document resolutions.

FIG. 1 illustrates several embodiments for processing an original image or original image data of a digital document 102 having a resolution of, for example, 500 dpi. In one embodiment, digital document 102 may undergo processing 104 so as to become a stamped document 106 having a two-dimensional barcode, from which the original image of digital document 102 may be reproduced. As illustrated in FIG. 1, the two-dimensional barcode may be associated with stamped document 106 such that the barcode is placed over a reproduction of the original image of digital document 102. This reproduction of the original image, as embodied in stamped document 106, may have the same, or at least substantially similar, resolution as that of the original image of digital document 102.

In another embodiment, digital document 102 may undergo processing 104 so as to become stamped document 108 having a two-dimensional barcode, from which the original image may be reproduced, wherein the resolution of the reproduction of the original image is decreased, such as to 150 dpi, for instance. In this implementation, the file size of the newly created document 108 may be reduced due to the decreased resolution reproduction of the original image. This reduced file size may provide a user with advantages such as smaller data storage requirements and faster data transfer of the document. Further to this, even though the resolution of the reproduced original image is reduced, the full resolution original image may be restored from the information encoded in the two-dimensional barcode associated therewith.

Still referring to FIG. 1, digital document 102 may undergo processing 104 to produce only a two-dimensional barcode 110, from which the original image of digital document 102 may be reproduced. By this implementation, barcode 110 may have been the only product of processing 104. Alternatively, barcode 110 may have been cropped from an original image or reproduction; the original image or reproduction may have been cut away or otherwise removed; or the original image or reproduction may have been decreased in resolution to the extent that only barcode 110 is remaining. Accordingly, a user may store barcode 110 with lower data storage requirements, and/or electronically transfer barcode 110 at faster bit rates.

Subsequent to processing 104 by any of the aforementioned embodiments, a user may decode any of the two-dimensional barcodes of documents 106, 108 and 110 in order to recover a complete reproduction of an original image, such as the original image as received from digital document 102 for processing 104. Accordingly, even though a reduced file size is created through processing 104, the complete set of data associated with the original image may be encoded within the two-dimensional barcodes.

Figure 2:
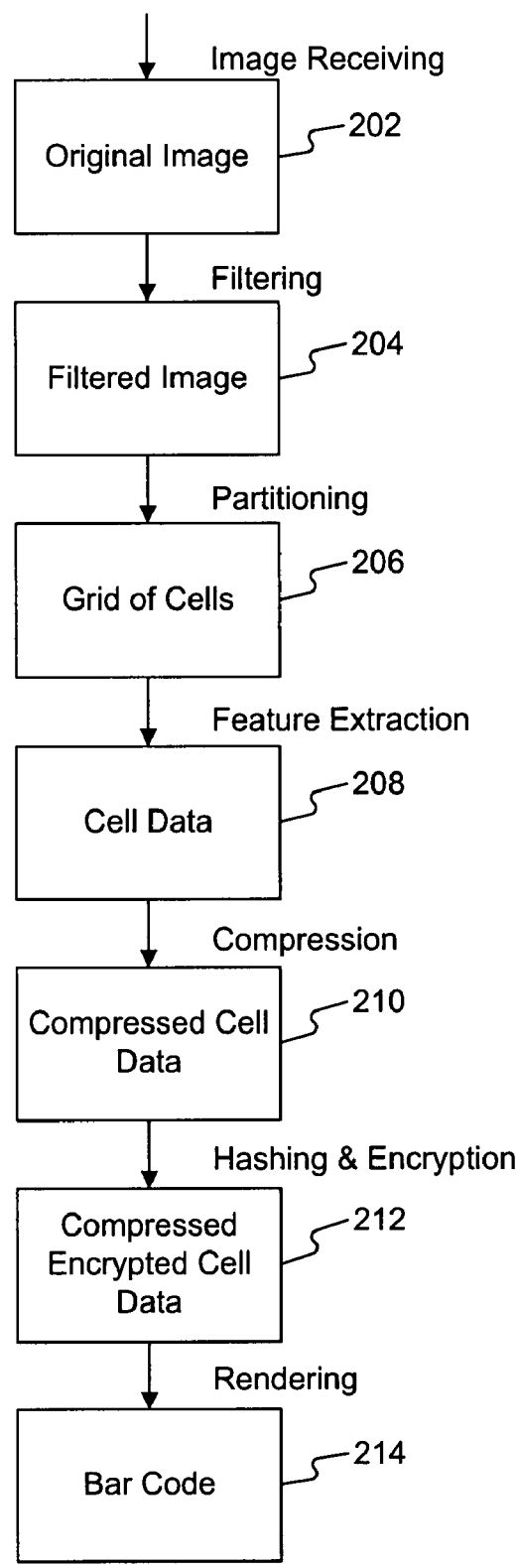
FIG. 2 is a flowchart illustrating original image data processing steps consistent with the present invention.

FIG. 2 is a flowchart illustrating exemplary processing steps for processing image data of documents and associated barcodes. An original image 202 may first be received by any of various methods. In one embodiment, an original image is obtained via a scanner. In this implementation, a hardcopy paper item may be scanned into a digital image format for transmission to a personal computer. Alternatively, an original image may be obtained as a digital image of a document as transmitted over a network such as a telephony-based network, a local area network (LAN), a wide area network (WAN), a wireless network, an intranet, the Internet or any other communication means. In a further embodiment, a digital image of a document is received as an attachment to an email. An original image may also be obtained from locally-connected media such as a floppy disk, CD-ROM, DVD, USB drive or any other data storage means.

Once an original image of a document has been received in digital format, the image may be filtered. Specifically, in a primarily textual file, font information may be distinguished from non-font information (e.g., dirt, spot etc.). In this implementation, non-font information may be deleted from the original digital document. In a further embodiment, a document containing photographic or graphical images may undergo photographic processing steps such as alterations to sharpness, brightness, contrast, tone, color, or any other parameter commonly altered in digital photo processing. Various features of an image may be removed, edited, thickened, thinned, separated etc. as desired until the filtered image 204 is produced.

Subsequently, the filtered image 204 may be partitioned into smaller areas for feature extraction. In one exemplary embodiment, the original image may be a 300 dpi (Dots Per Inch) scan of a Letter size sheet (8.5 inches×11 inches). This results in an image size of 3300×2550 pixels. During the partitioning step, the image may be divided into a grid of cells 206 varying in cell size depending on the capacity of the two-dimensional barcode stamp to be used and depending on the user's desired threshold of tamper detection. In one exemplary embodiment, a digital document is divided into a grid of 150×150 cells. Each cell therein is 22×17 pixels. In further embodiments, the document image may be divided into a grid of 32×32 cells, 64×64 cells, 128×128 cells, 150×150 cells, 256×256 cells, etc., depending upon desired resolution.

After partitioning, each cell may undergo a feature extraction step so as to retrieve cell data 208. According to one embodiment, objects in each cell may be defined by an algorithm such as FFT, DCT, Area, Perimeter, or Angles, etc. Some content-based feature from each cell may be required in order to uniquely define the content of each cell. These features may be selected based on several methods as long as they can provide a unique definition of the content of the cell not easily produced by a different cell in the grid. In further embodiments, objects in each grid may simply be defined by bitmap, raster, or other representation.

Each set of extracted cell data 208 may then be compressed and encoded to create compressed cell data 210. According to certain embodiments, due to size limitation of the two-dimensional barcode stamp, the compressed cell data 210 may require further processing, such as, hashing, such that it occupies a single byte. In one exemplary embodiment, the size of the stamp may be approximately 3600 bits (i.e., 450 bytes). Each set of extracted cell data may be compressed and hashed into 1 byte by a Hash Function. In a 150×150 grid there are 374 blocks, each of 1 byte, which fits the capacity of a 450 byte stamp, thus providing room for additional data for error correction etc. In this implementation, the 374 bytes of compressed data may be RSA-encrypted with a pubic key prior to embedding, in order to resist reverse engineering. After the document image data has been compressed and encrypted, compressed, and encrypted cell data 212 may be passed to a barcode renderer, which renders barcode 214 for association with the original image or reproduction of the original image.

It will be apparent to those skilled in the art that many different processing methods may be suitable for implementing the functionality of the above processing steps. Specifically, the particular above-referenced steps along with the flowchart of FIG. 2 are merely one exemplary embodiment of the myriad available processing steps applicable to the present principles and within the scope of the present invention. That is, alternative steps and sequences in the process of encoding and decoding between original document image data and barcode data are applicable to and consistent with the present system and method for generating a barcode, from which an original image may be reproduced.

Figure 3:
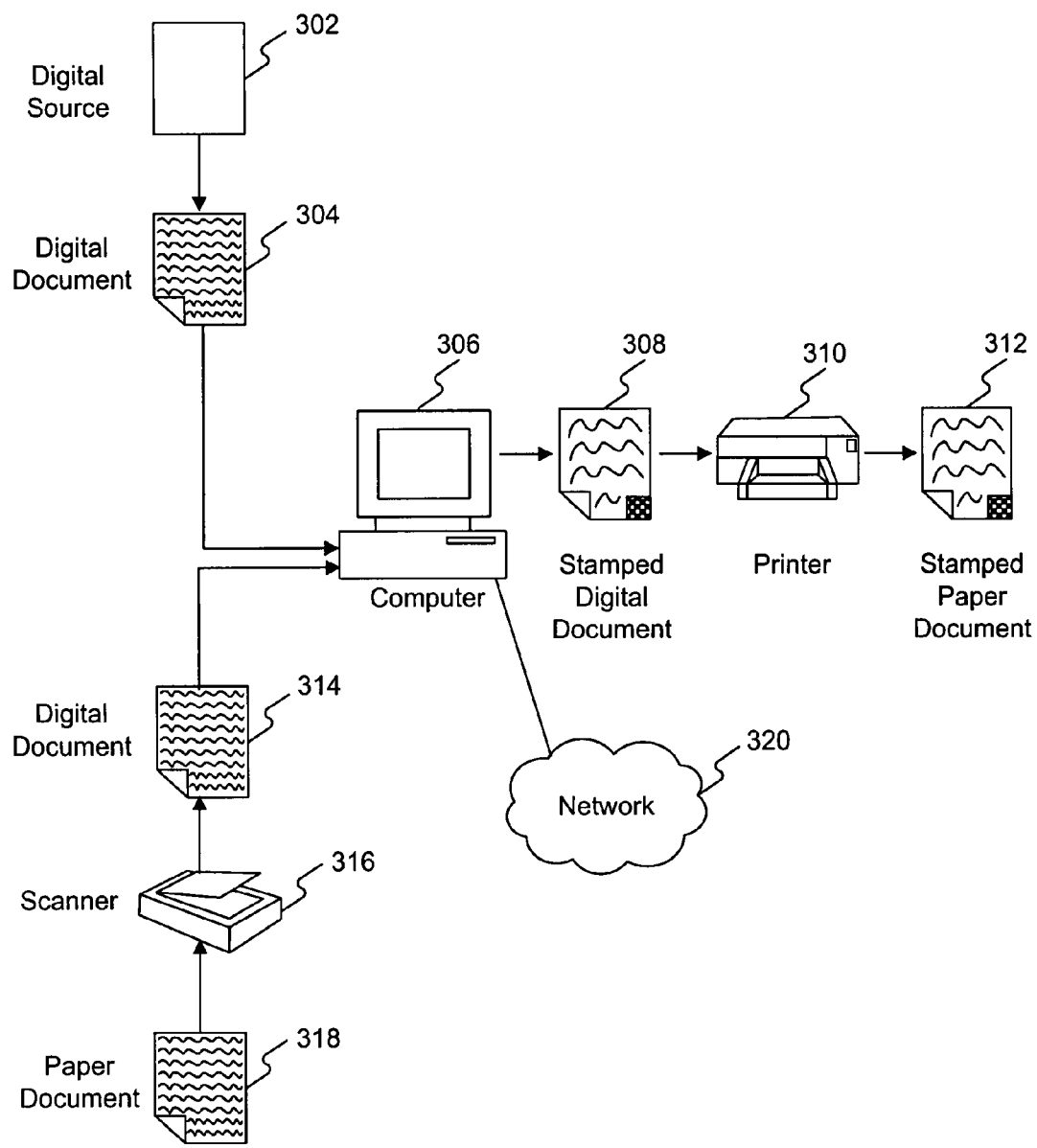
FIG. 3 is a block diagram illustrating original image retrieval methods consistent with the present invention.

FIG. 3 illustrates a block diagram of one embodiment of an exemplary image data processing system 300. As shown in FIG. 3, system 300 may include a digital source 302, a scanner 316, a personal computer 306, a printer 310, and a network 320. In particular, FIG. 3 illustrates several alternative arrangements for obtaining an original image or original image data of a document.

In one embodiment, an original image may be obtained as digital document 304 from any digital source 302 including, but not limited to, a locally connected media such as a floppy disk, CD-ROM, DVD, USB drive or any other data storage means. Alternatively, the image-obtaining component may be a scanner 316. In this implementation, scanner 316 may convert image data from a scanned, hardcopy paper document 318 into digital document 314 for transmission to computer 306 for processing. In further embodiments, an original image document may be obtained as transmitted from a network 320 such as a telephony-based network, a local area network (LAN), a wide area network (WAN), a wireless network, an intranet, the Internet or any other communication means. Computer 306 may thereby transmit and receive digital communications, such as data files including documents, to and from remote locations. Specifically, computer 306 may receive digital documents for processing via network 320. Moreover, computer 306 may transmit processed and stamped digital documents after processing via network 320. In one embodiment, a digital image of a document may be received via network 320 as an attachment to an e-mail. In one or more embodiments, the image-obtaining component may also include an internal information-receiving element of a computer. Accordingly, the computer 306 may receive a digital document for processing into stamped digital document 308.

In one or more embodiments, computer 306 may include a storage component, a processor, and a barcode-producing component. The storage component may store a program of instructions including instructions for generating barcode data for a two-dimensional barcode to be associated with the original image, wherein the two-dimensional barcode encodes a representation of the original image such that the original image may be reproduced from the two-dimensional barcode. The storage component may include any type of memory such as: magnetic storage including floppy disk, hard disk, or magnetic tape; semiconductor storage such as solid state disk (SSD) or flash memory; optical disc storage such as CD-ROM, CD-RW, DVD, DVD-RW, Blu-ray, or HD DVD; magneto-optical disc storage; phase-change memory; or holographic storage.

Furthermore, computer 306 may include one or more processors for processing data according to instructions stored in the storage component. The functions of the processor may be provided by a single dedicated processor or by a plurality of processors. Moreover, the processor may include, without limitation, digital signal processor (DSP) hardware, or any other hardware capable of executing software. The barcode-producing component may produce a barcode based on the processed original image data, wherein the barcode has a resolution sufficiently high to reproduce the full representation of the original image. Specifically, a sufficient amount of information may be encoded within the barcode such that the original image may be digitally reproduced and/or printed without the need for access to any other stored image data. Accordingly, computer 306 may create stamped digital document 308 having a decreased-resolution reproduction of the document image and an associated barcode from which the original image of the document may be reproduced. Stamped digital document 308 may subsequently be printed as stamped paper document 312 by a printer 310 in communication with computer 306.

Figure 4A:
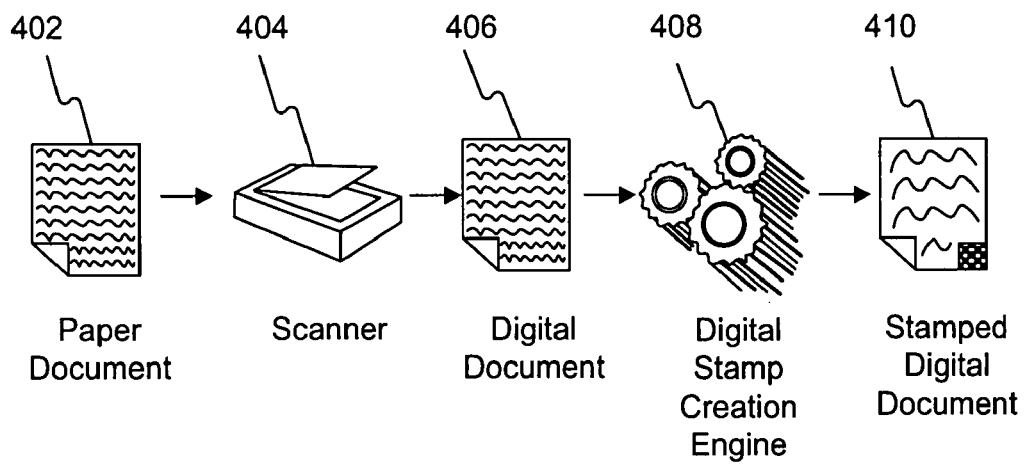
FIG. 4a is a block diagram illustrating an image data processing system consistent with the present invention.

FIG. 4A illustrates a block diagram of another embodiment of an image data processing system that processes images and two-dimensional barcodes associated with the images. In this implementation, the system may include an image-obtaining component, such as a scanner 404, as well as a digital stamp creation engine 408. In this particular embodiment, scanner 404 may receive an original image or original image data by scanning a paper document 402. Scanner 404 may convert paper document 402 into a digital document 406 for processing by a digital stamp creation engine 408. In one embodiment, digital stamp creation engine 408 may include a storage component, a processor, a barcode-producing component, and a document-producing component.

The storage component of digital stamp creation engine 408 may store a program of instructions including instructions for generating barcode data for a two-dimensional barcode that encodes a representation of the original image such that the original image can be reproduced from the two-dimensional barcode. The processor of digital stamp creation engine 408 may process image data according to instructions which are stored in the storage component. The barcode-producing component of digital stamp creation engine 408 may produce the two-dimensional barcode from which the original image may be reproduced. The document-producing component of digital stamp creation engine 408 may produce a document including the barcode and a reproduction of the original image.

In one embodiment, the processor of digital stamp creation engine 408 may execute reproduction creation programming that generates a decreased amount of original image data to create the reproduction (i.e., by decreasing the resolution of the reproduction). Digital stamp creation engine 408 may thereby convert digital document 406 into stamped digital document 410, wherein the document may include a decreased-resolution reproduction of the document image, as well as a barcode, from which the original document can be reproduced. Accordingly, the newly created document may have a smaller file size so as to provide related advantages, such as decreased data storage requirements and faster electronic document transfer.

Figure 4B:
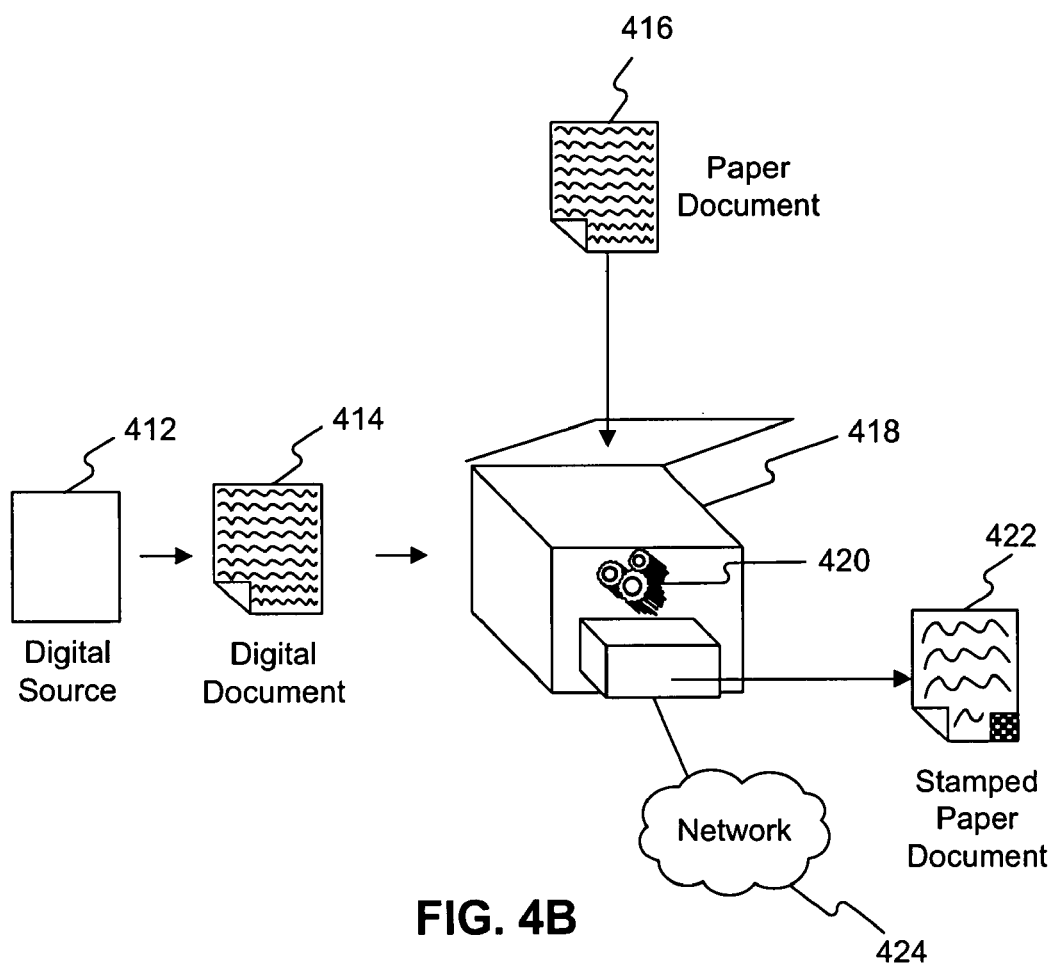
FIG. 4b is a block diagram illustrating a multi-function device type image data processing system consistent with the present invention.

FIG. 4B is a block diagram illustrating an exemplary image data processing system which may include a digital source 412, a multi-function type device 418 (scanner/printer/fax commonly known as an "all-in-one" device) and a network 424. Device 418 may include printing, fax and scanning capabilities, and may range from a small, consumer-type model, to a large, commercial or office-type device.

Digital source 412 may include any locally connected media such as a floppy disk, CD-ROM, DVD, USB drive or any other data storage means in communication with device 418. Network 424 may allow device 418 to communicate transmission or receipt of documents to and from remote locations via a telephony-based network, a local area network (LAN), a wide area network (WAN), a wireless network, an intranet, the Internet or any other communication means. Accordingly, device 418 may obtain an original image or image data either by scanning a paper document 416, by receiving a digital document 414 from digital source 412, or by electronic transmission over network 424. Moreover, device 418 may produce a document by either printing a processed and stamped paper document 422 or by creating a stamped digital document for electronic transmission across network 424.

In one embodiment, device 418 may include an image-obtaining component, a built-in digital stamp creation engine 420 and a document-producing component. Digital stamp creation engine 420 may include a storage component, a processor, a barcode-producing component, and a document-producing component.

The storage component of digital stamp creation engine 420 may store a program of instructions including instructions for generating barcode data for a two-dimensional barcode that encodes a representation of the original image such that the original image can be reproduced from the two-dimensional barcode. The processor of digital stamp creation engine 420 may process image data according to instructions which are stored in the storage component. The barcode-producing component of digital stamp creation engine 420 may produce the two-dimensional barcode from which the original image may be produced. The document-producing component of digital stamp creation engine 420 may produce a document including the barcode and a reproduction of the original image.

In one embodiment, the processor of digital stamp creation engine 420 may execute reproduction creation programming that generates a decreased amount of original image data to create the reproduction (i.e., by decreasing the resolution of the reproduction). Digital stamp creation engine 420 may, thereby, convert digital document 414 into a processed and stamped digital document 422 wherein the document may include a decreased-resolution reproduction of the document images, and a barcode, from which the original document can be reproduced. Accordingly, the newly created document may have a smaller file size so as to provide related advantages, such as decreased data storage requirements and faster electronic document transfer.

In further embodiments of the present disclosure, storage mediums are disclosed that store computer-readable programs of instructions for processing images and two-dimensional barcodes associated with the images. In this implementation, the programs of instructions may include instructions that instruct a processor to execute the steps of: obtaining an original image; processing the original image into encoded data; rendering the encoded data into a two-dimensional barcode from which the original image can be reproduced; and producing a document including the two-dimensional barcode and a reproduction of the original image (e.g., rendering on a reproduction of the document, placement on the original document, etc.); wherein the reproduction is represented by a smaller amount of data than the original image, whereby the document may have a reduced file size for faster electronic transfer. In still further embodiments of the present disclosure, storage mediums may store a control program that processes image data and two-dimensional barcodes associated with the image data. The control program may include: a code for a receiving step of receiving an original image; a code for a filtering step of filtering out noise and undesirable features from the original image; a code for a partitioning step of partitioning the original image into a grid of cells; a code for an extracting step of extracting features from each of the cells to provide cell data; a code for a compressing step of compressing the cell data from each cell to yield compressed cell data; a code for a manipulating step of manipulating the compressed cell data to produce encoded data; a code for a rendering step of rendering the encoded data into a two-dimensional barcode from which the original image can be reproduced; and a code for a producing step of producing a document including the two-dimensional barcode and a reproduction of the original image (e.g., rendered on a reproduction of the document, placed on the original document, etc.), wherein the reproduction is represented by a smaller amount of data than the original image, whereby the document may have a reduced file size for faster electronic transfer.

The above computer-readable programs, control programs, and codes may be embodied in any form of tangible media storage such as: magnetic storage including floppy disk, hard disk, or magnetic tape; semiconductor storage such as solid state disk (SSD) or flash memory (e.g., USB drive); optical disc storage such as CD-ROM, CD-RW, DVD, DVD-RW, Blu-ray, or HD-DVD; magneto-optical disc storage; phase-change memory; or holographic floppy disk or any other machine readable storage medium. In particular, when the above programs and/or codes are implemented into and executed by a computer, either by the above storage mediums or over a network such as a telephony-based network, a local area network (LAN), a wide area network (WAN), a wireless network, an intranet, the Internet or any other communication means, the computer becomes an apparatus and/or part of system for practicing the invention. That is, the programs and code, when embodied in or integrated with a processor, function to create a machine or apparatus having a unique structure of circuitry.

In a further embodiment of the present disclosure, a method of processing images and two-dimensional barcodes associated with the images is also disclosed. The method may include obtaining an original image; processing the original image into encoded data; rendering the encoded data into a two-dimensional barcode from which the original image can be reproduced; and producing a document including the barcode and a reproduction of the original image (e.g., rendering the barcode on the reproduction, placing the barcode on the original document, etc.) wherein the reproduction is represented by a smaller amount of data than the original image, whereby the document may have a reduced file size for faster electronic transfer.

Under further embodiments, the two-dimensional barcode itself may have a lower resolution (e.g., 300 dpi) than the original image (e.g., 600 dpi) of the document, such that the footprint of the two dimensional bar code may be smaller than it would be had the barcode been rendered in the same in resolution as the original image. In this implementation, a digital stamp creation engine may create a high resolution two-dimensional barcode for association with a reproduction of a digital document consistent with the systems and methods disclosed above, such that the barcode associated with the reproduction has a higher resolution than the original image of digital document itself.

Moreover, because the resolution of the two-dimensional barcode may be higher than that of the original image, more information may be stored in the same size two-dimensional barcode thereby permitting the size of the barcode to be reduced (i.e., to create a smaller footprint). Likewise, because the resolution of the original image reproduction may be lower than that of the original image, the size of the barcode and reproduced original image may be smaller, such that there may be decreased data storage requirements and increased data transfer rates.

Specifically, in a further embodiment, a barcode of 5 pixels by 5 pixels at 300 DPI, wherein the tile size is 400 µm×400 µm and a pixel is 80 µm across, may be increased in resolution to 600 DPI. In this implementation, the higher resolution barcode may have a smaller area (i.e., footprint) with a tile size of 200 µm×200 µm because each pixel is now 40 µm across. Because this higher resolution stores more data per unit of area, the barcode of reduced area may provide substantially equivalent or increased capacity.

Figure 5:
FIG. 5 is a diagrammatic representation of a black and white barcode system consistent with the present invention.
Figure 6:
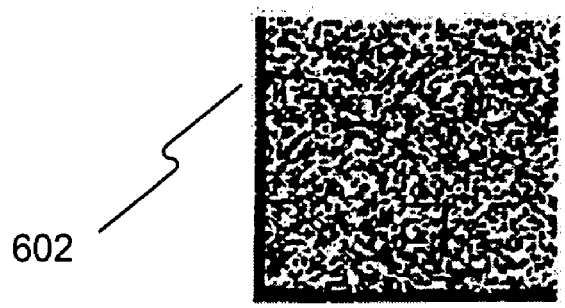
FIG. 6 is a diagrammatic representation of an 8-Bit grayscale barcode system consistent with the present invention.
Figure 7:
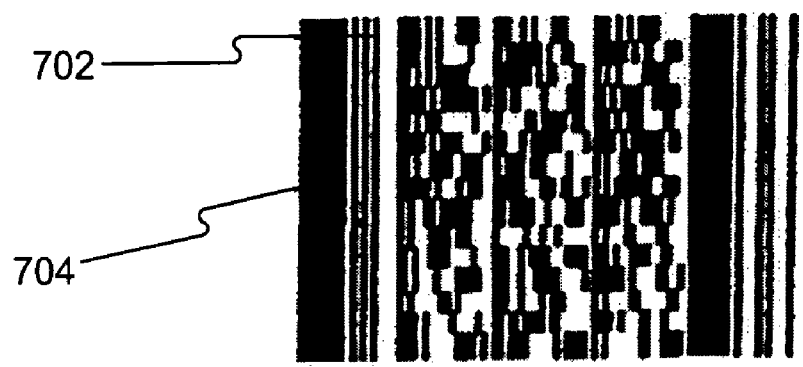
FIG. 7 is a diagrammatic representation of a PDF417 barcode system consistent with the present invention.
Figure 8:
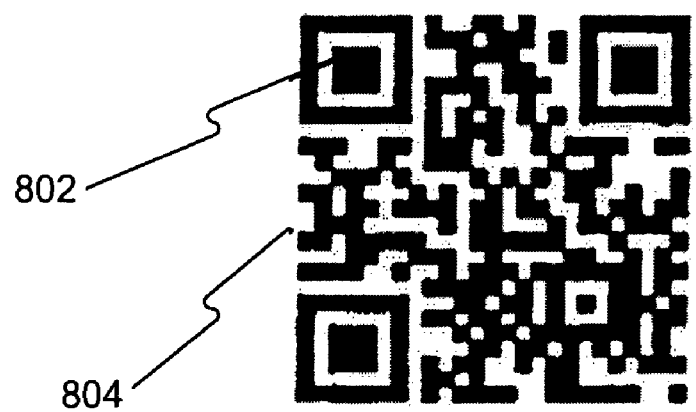
FIG. 8 is a diagrammatic representation of a QRCODE barcode system consistent with the present invention.

Various two-dimensional barcodes may be incorporated in and are contemplated for use in the present invention. Many prior-art references have detailed the myriad types of barcodes, most of which are applicable to the methods and systems disclosed herein. For example, U.S. Pat. No. 5,490,217 discloses a high capacity two-dimensional barcode for association with a document. U.S. Pat. No. 5,513,264 discloses one-dimensional codes such as UPC, Code 39, and Code 128; two-dimensional barcodes such as PDF 417, Code 49 and Code 16K; matrix codes such as Data Code, Code 1, Vericode and MaxiCode; and graphic codes such as Glyphs; U.S. Pat. No. 6,565,003 discloses a two-dimensional barcode having a 20×20 array of data bits. U.S. Pat. No. 6,753,977 discloses a document barcode that is imperceptible to the human eye. Several particular barcodes are disclosed herein, however, merely for the purposes of example. In one embodiment consistent with the present invention, the rendered barcode is a rectangular, two-dimensional barcode. Specifically, FIG. 5 illustrates one type of black & white barcode having a tile size of 5×5 pixels, wherein the maximum digital-only data capacity is 90,000 bits and the maximum closed loop data capacity is 3,600 bits. This size of barcode may allow for effective reading, printing and scanning. FIG. 6 illustrates an 8-bit grayscale barcode having a tile size of 1×1 pixels, wherein the maximum digital-only data capacity is 720,000 bits and the maximum closed loop data capacity is 28,800 bits. Comparatively, this barcode may have lower printing and scanning effectiveness. Higher-capacity barcodes, such as the PDF417 shown in FIG. 7 and the QRCODE shown in FIG. 8, may also be applicable to the present disclosure.

It will be apparent to those skilled in the art that many different barcodes may be suitable for implementing the functionality of the present systems and methods as described above. The barcodes listed are intended to be merely exemplary and not limiting in any way. Furthermore, applicable barcodes are intended to encompass both structural and functional equivalents of those listed. Additionally, it is intended that such equivalents include both currently known barcode equivalents as well as any equivalents developed in the future.

In addition to providing lower data storage requirements and/or faster electronic transfer of document information, the disclosed systems and methods may be useful in the event that a user desires to transmit a document electronically, such that a recipient may be able to view at least an approximation of the document (i.e., a decreased-resolution reproduction of the document) immediately upon receipt, while also, however, retaining the ability to convert an associated barcode into a complete reproduction of the original image of the document.

Specifically, a user desiring to transmit a document image over a network such as a telephony-based network, a local area network (LAN), a wide area network (WAN), a wireless network, an intranet, the Internet or any other communication means, may choose to decrease the file size of the document in order to speed transmission of the document. Alternatively, a user desiring to store a document image may choose to decrease the file size of the document in order to decrease the storage requirements and/or to increase the amount of available memory in a computer drive or other storage component. Accordingly, the user may process image data from the document according to various processing steps such as, but not limited to, the aforementioned processing steps. By these implementations, the resolution of the original image reproduction may be decreased between the steps of obtaining original image data and producing a reproduction of the original image. Although the resolution of the original image reproduction may be decreased, the full set of data associated with the original image having full resolution may be encoded in the relatively high resolution two-dimensional barcode associated therewith. Specifically, the user may retain a high resolution barcode from which the original resolution image data may be recovered in order to maintain the capability of substantially replicating the document, either electronically, digitally, or physically. The barcode may be accompanied by a reproduction of the original image of the document or it may be transmitted alone. The reproduction of the original image of the document may have a resolution varying between that of the original image and a resolution that essentially voids all image data such that substantially no image data remains. That is, there may only be a barcode remaining which is visible to the naked eye. The user may adjust the processing steps to select a resolution between this range depending upon desired file transfer and storage specifications. In one embodiment, in the event that substantially only barcode data remains in the processed document, a user or system of the present disclosure may crop or otherwise remove any other image data from the document which is not necessary for reproduction of the original image of the document.

In a further embodiment, the document-producing component may create a reproduction of the original image of the document in combination with the two-dimensional barcode such that the resolution of the two-dimensional barcode may be higher than that of the original image and the resolution of the original image reproduction may be lower than that of the original image. Accordingly, because the resolution of the two-dimensional barcode may be higher than that of the original image, more information may be stored in the same size two-dimensional barcode thereby permitting the footprint size of the barcode to be reduced. Moreover, because the resolution of the original image reproduction may be lower than that of the original image, the file size of the barcode and original image reproduction may be reduced. Thus, a barcode according to this embodiment may have a smaller footprint, which yields greater usable space on the reproduced document, while an original image reproduction according to this embodiment may have decreased data storage requirements and increased data transfer rates.

It should be noted that the foregoing embodiments merely illustrate the various principles of the present invention. Those skilled in the art will therefore be able to formulate variations of the foregoing embodiments which are not explicitly disclosed herein, but which are within the scope of the present principles. Moreover, those embodiments and examples disclosed herein along with any statements, conditional language or recitations are intended to be only for purposes of aiding the reader in understanding those principles. It is further intended that the scope of the embodiments and examples herein include structural and functional equivalents including both those currently known, and those developed in the future.

Accordingly, it will further be appreciated by those skilled in the art that the diagrams, flowcharts, and block diagrams illustrated herein are merely intended to assist the reader in understanding certain embodiments of the concepts and principles contemplated by the present invention. Other embodiments of the invention will be apparent to those skilled in the art from consideration of the specification and practice of the invention disclosed herein. It is intended that the true scope and spirit of the present invention be indicated by the following claims.

What is claimed is:

1. A system for processing image data, comprising:
    an image-obtaining component that receives original image data from an original image;
    a storage component that stores a program of instructions including instructions for generating barcode data for a two-dimensional barcode that encodes the original image data such that the original image is reproducible from the two-dimensional barcode;
    a processor that processes the original image data;
    a barcode-producing component that produces the two-dimensional barcode based on the original image data; and
    a document-producing component that produces a document including the two-dimensional barcode and a reproduction of the original image;
    wherein the reproduction has a lower resolution than the original image, and the reproduction is represented by a smaller amount of data than the original image, whereby the document has a reduced file size; and
    wherein a full-resolution original image is reproducible from the two-dimensional barcode produced with the reproduction.

2. The system of claim 1 wherein the storage component, processor, and barcode-producing component are associated with a personal computer, and wherein the system further comprises:
    a scanner in communication with the personal computer configured to obtain the original image data; and
    a printer in communication with the personal computer configured to print the document including the two-dimensional barcode and the reproduction of the original image.

3. The system of claim 1 comprising a component for decreasing the resolution of the reproduction.

4. The system of claim 1 comprising a component for decreasing the area of the reproduction.

5. The system of claim 1 comprising a component for decreasing a footprint size of the two-dimensional barcode.

6. A system for processing image data, comprising:
    a scanner that receives original image data from an original image;
    a personal computer comprising:
        a storage component that stores a program of instructions including instructions for generating barcode data for a two-dimensional barcode that encodes the original image data such that the original image is reproducible from the two-dimensional barcode;
        a processor that processes the original image data; and
        a barcode-producing component that produces the two-dimensional barcode based on the original image data; and
    a printer that produces a document including the two-dimensional barcode and a reproduction of the original image;
    wherein the reproduction has a lower resolution than the original image, and the reproduction is represented by a smaller amount of data than the original image, whereby the document has a reduced file size; and
    wherein a full-resolution original image is reproducible from the two-dimensional barcode produced with the reproduction.

7. A method of processing image data, the method comprising:
    obtaining an original image;
    processing the original image into encoded data;
    rendering the encoded data into a two-dimensional barcode from which the original image is reproducible; and
    producing a document including the two-dimensional barcode and a reproduction of the original image;
    wherein the reproduction has a lower resolution than the original image, and the reproduction is represented by a smaller amount of data than the original image, whereby the document has a reduced file size; and
    wherein a full-resolution original image is reproducible from the two-dimensional barcode produced with the reproduction.

8. The method of claim 7 wherein the smaller amount of original image data of the reproduction is generated via lower density data storage of the reproduction.

9. The method of claim 7 wherein the smaller amount of original image data of the reproduction is generated by reducing the area of the reproduction.

10. The method of claim 8 wherein the area of the reproduction is reduced to the extent that only the barcode is remaining for electronic transfer.

11. The method of claim 7 wherein a footprint size of the two-dimensional barcode is decreased via higher density data storage of the two-dimensional barcode.

12. The method of claim 7 wherein the step of processing the original image comprises:
- filtering out noise and undesirable features from the original image;
- partitioning the original image into a grid of cells;
- extracting features from each of the cells to provide cell data;
- compressing the cell data from each cell to yield compressed cell data; and
- manipulating the compressed cell data to produce encoded data.

13. A storage medium that stores computer-readable programs of instructions, the programs of instructions including instructions that instruct a processor to execute the steps of:
- obtaining an original image;
- processing the original image into encoded data;
- rendering the encoded data into a two-dimensional barcode from which the original image is reproducible; and
- producing a document including the two-dimensional barcode and a reproduction of the original image;
- wherein, the reproduction has a lower resolution than the original image, and the reproduction is represented by a smaller amount of data than the original image, whereby the document has a reduced file size; and
- wherein a full-resolution original image is reproducible from the two-dimensional barcode produced with the reproduction.

14. The storage medium of claim 13 wherein the smaller amount of original image data of the reproduction is generated via lower density data storage of the reproduction.

15. The storage medium of claim 13 wherein the smaller amount of original image data of the reproduction is generated by reducing the area of the reproduction.

16. The storage medium of claim 14 wherein the area of the reproduction is reduced to the extent that only the two-dimensional barcode is remaining for electronic transfer.

17. The storage medium of claim 13 wherein a footprint size of the two-dimensional barcode is decreased via higher density data storage of the barcode.

18. The storage medium of claim 13 wherein the step of processing the original image comprises:
- filtering out noise and undesirable features from the original image;
- partitioning the original image into a grid of cells;
- extracting features from each of the cells to provide cell data;
- compressing the cell data from each cell to yield compressed cell data; and
- manipulating the compressed cell data to produce encoded data.

19. A storage medium storing a control program for processing image data, the control program comprising:
- a code for an obtaining step of obtaining an original image;
- a code for a filtering step of filtering out noise and undesirable features from the original image;
- a code for a partitioning step of partitioning the original image into a grid of cells;
- a code for an extracting step of extracting features from each of the cells to provide cell data;
- a code for a compressing step of compressing the cell data from each cell to yield compressed cell data;
- a code for a manipulating step of manipulating the compressed cell data to produce encoded data;
- a code for a rendering step of rendering the encoded data into a two-dimensional barcode from which the original image is reproducible; and
- a code for a producing step of producing a document including the two-dimensional barcode and a reproduction of the original image;
- wherein, the reproduction has a lower resolution than the original image, and the reproduction is represented by a smaller amount of data than the original image, whereby the document has a reduced file size; and
- wherein a full-resolution original image is reproducible from the two-dimensional barcode produced with the reproduction.

20. An image data processing system comprising:
- means for obtaining original image data from an original image;
- means for storing a program of instructions including instructions for generating barcode data for a two-dimensional barcode that encodes the original image data such that the original image is reproducible from the two-dimensional barcode;
- means for processing the original image data;
- means for producing the two-dimensional barcode based on the original image data; and
- means for producing a document including the two-dimensional barcode and a reproduction of the original image;
- wherein, the reproduction has a lower resolution than the original image, and the reproduction is represented by a smaller amount of data than the original image, whereby the document has a reduced file size; and
- wherein a full-resolution original image is reproducible from the two-dimensional barcode produced with the reproduction.

* * * * *